(12) United States Patent
Lee (10) Patent No.: US 12,337,773 B2
(45) Date of Patent: Jun. 24, 2025

(54) METHOD AND APPARATUS FOR PROVIDING INFORMATION ON GREENHOUSE GAS EMISSIONS OF HYDROGEN VEHICLES

(71) Applicants: Hyundai Motor Company, Seoul (KR); Kia Corporation, Seoul (KR)

(72) Inventor: Dong Yun Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 184 days.

(21) Appl. No.: 18/346,574

(22) Filed: Jul. 3, 2023

(65) Prior Publication Data
US 2024/0092288 A1    Mar. 21, 2024

(30) Foreign Application Priority Data
Sep. 6, 2022 (KR) .................. 10-2022-0112858

(51) Int. Cl.
*B60R 16/023*    (2006.01)
(52) U.S. Cl.
CPC .................. *B60R 16/0236* (2013.01)
(58) Field of Classification Search
CPC ...... B60R 16/0236; Y02T 10/80; Y02T 90/40
USPC ......... 701/31.4, 31.5, 32.3, 32.4, 32.5, 33.4, 701/123
See application file for complete search history.

(56) References Cited

U.S. PATENT DOCUMENTS

| | | | |
|---|---|---|---|
| 2015/0324807 A1* | 11/2015 | Pacheco | G06Q 30/018 705/317 |
| 2018/0130123 A1* | 5/2018 | Ross | G06Q 20/145 |
| 2021/0256781 A1* | 8/2021 | Jörn | G01C 21/3469 |
| 2023/0259995 A1* | 8/2023 | Matsumura | G06Q 30/0283 |

FOREIGN PATENT DOCUMENTS

| | | | |
|---|---|---|---|
| KR | 101322332 B1 | 10/2013 | |
| KR | 20160000348 A | 1/2016 | |
| WO | WO-2020067068 A1 * | 4/2020 | ............ B60K 35/00 |

* cited by examiner

*Primary Examiner* — Erick R Solis
(74) *Attorney, Agent, or Firm* — Slater Matsil, LLP (57) ABSTRACT

A method and apparatus for providing information on the greenhouse gas emissions of a hydrogen vehicle are disclosed. According to an embodiment of the present invention, a method of providing information on the greenhouse gas emissions of the vehicle includes receiving driving information from the vehicle, determining a filling station at which hydrogen filling is performed when it is determined based on the driving information that the hydrogen was filled in the vehicle, and determining greenhouse gas emissions of the vehicle based on a hydrogen production method of the determined filling station and the driving information.

22 Claims, 5 Drawing Sheets

METHOD AND APPARATUS FOR PROVIDING INFORMATION ON GREENHOUSE GAS EMISSIONS OF HYDROGEN VEHICLES

CROSS-REFERENCE TO RELATED APPLICATIONS

The present application claims priority to Korean Patent Application No. 10-2022-0112858, filed on Sep. 6, 2022, which application is incorporated herein in its entirety.

TECHNICAL FIELD

The present invention relates to connectivity, and more particularly to a method and apparatus for providing information on greenhouse gas emissions of hydrogen vehicles provided on a connectivity platform.

BACKGROUND

Greenhouse gases are gases present in the atmosphere and causing the greenhouse effect by absorbing a part of the energy radiated from the ground. Typical greenhouse gas includes water vapor, carbon dioxide, and methane.

As global warming becomes more severe, various efforts are being made to reduce environmental pollution recently. As a result, the exhaust gas emissions of vehicles that emit a lot of carbon monoxide are also restricted by policy.

On the other hand, regarding the greenhouse gas emissions of vehicles, there is a difference between the greenhouse gas emissions indicated by the original equipment manufacturer (OEM) and the greenhouse gas emissions calculated by the government as a standard criterion. Further, conventional internal combustion engine vehicles emit greenhouse gases in the process of operating the vehicles while hydrogen electric vehicles emit no greenhouse gases in the process of driving the vehicles. Conventionally, carbon emissions are expressed in terms of $CO_2$ emissions of the equivalent vehicles, but there is no distinct method of accurately calculating how much greenhouse gases are reduced by driving hydrogen electric vehicles. However, when hydrogen is produced at a hydrogen filling station, carbon is emitted so that carbon emissions are indirectly calculated based thereon sometimes.

The hydrogen production method at hydrogen filling stations includes the water electrolysis (alkaline, polyelectrolyte, solid oxide) method, the carbon reforming (natural gas, coal) method, and the byproduct hydrogen method, and $CO_2$ emissions differ for each production method.

The water electrolysis method is a method of producing hydrogen by decomposing water without emitting greenhouse gases, but $CO_2$ is emitted in the production of electricity required in water electrolysis. The carbon reforming method uses fossil fuels and emits greenhouse gases. Greenhouse gas emissions from byproduct hydrogen production vary depending on whether the hydrogen produced as a byproduct is gray hydrogen or blue hydrogen.

As described above, respective hydrogen filling stations employ different hydrogen production methods, and greenhouse gas emissions differ depending on the hydrogen production methods. However, the conventional method of calculating carbon emissions simply measures carbon emissions based on a driving distance of a vehicle alone and fails to accurately reflect the characteristics of the carbon emissions of the respective hydrogen filling stations.

Therefore, this field of technology needs technology for providing information on greenhouse gas emissions, the information reflecting all the information on the driving, filling, and filling stations of hydrogen vehicles taken into consideration.

SUMMARY

A technical object of the present invention is to calculate and provide total greenhouse gas emissions in the process of driving a hydrogen vehicle by collecting information on the driving, filling, and filling stations of the hydrogen vehicle.

Another technical object of the present invention is to provide a method and apparatus for calculating the greenhouse gas emissions of a hydrogen vehicle on a vehicle connectivity platform.

According to an embodiment of the present invention, a method of providing information on greenhouse gas emissions of a vehicle includes receiving driving information from the vehicle, determining a filling station at which hydrogen filling is performed when it is determined based on the driving information that the vehicle performed hydrogen filling, and determining greenhouse gas emissions of the vehicle based on the information on the hydrogen production method of the determined filling station and the driving information.

At this time, the driving information may include at least one or more of a driving distance, a hydrogen level, and location information of the vehicle.

At this time, the greenhouse gas emissions discharged in the process of transporting fuel are further used to determine the greenhouse gas emissions of the vehicle.

At this time, the amount of electricity used for hydrogen production and an emission coefficient of hydrogen-producing fuel at the hydrogen filling station are further used to determine the greenhouse gas emissions of the vehicle when the filling station produces hydrogen by a water electrolysis method.

At this time, the net calorific value of hydrogen-producing fuel, the emission coefficient of hydrogen-producing fuel, and the amount of greenhouse gas captured in the production process of hydrogen are further used to determine the greenhouse gas emissions of the vehicle when the filling station produces hydrogen by the reformed hydrogen method or byproduct hydrogen method.

At this time, the greenhouse gas emissions may be determined by multiplying the hydrogen emission coefficient of the hydrogen filling station, the driving distance to each hydrogen filling station at which hydrogen is filled in the vehicle, and the greenhouse gas emissions discharged in the process of transporting the fuel.

At this time, the driving distance to each filling station at which hydrogen is filled in the vehicle may be determined on the assumption that even when additional hydrogen is filled, without using up all hydrogen filled previously, at a filling station other than the previous station, the additional hydrogen is used only after the hydrogen filled previously is used up.

At this time, the hydrogen emission coefficient may be determined by multiplying the fuel efficiency of the hydrogen vehicle during the driving period, the ratio of the amount of electricity used for hydrogen production, and the electricity emission coefficient when the filling station produces hydrogen by the water electrolysis method.

At this time, the hydrogen emission coefficient may be determined by multiplying the fuel efficiency of the hydrogen vehicle with the value obtained by subtracting the ratio of the captured greenhouse gas to the produced hydrogen from the value obtained by multiplying the net calorific value of the fuel used for hydrogen production with the emission coefficient of the hydrogen-producing fuel when the filling station produces hydrogen by the reformed hydrogen method or the byproduct hydrogen method.

At this time, the communication unit may transmit to a database a message requesting information on the filling station at which hydrogen is filled in the vehicle, receive the filling station information from the database, receives a message requesting information on the greenhouse gas emissions of the vehicle from a terminal, and transmit the information on greenhouse gas emissions of the vehicle to the terminal, and the processor may update the information on the hydrogen filling of the vehicle in the memory or the database.

At this time, the message requesting the filling station information may include information on locations at which the hydrogen level of the vehicle increases.

As described above, according to various embodiments of the present invention, carbon emission information may be provided to drivers in real time so that the drivers may drive on the road conscious of the carbon emissions.

Further, carbon emissions during driving a hydrogen vehicle are monitored in real time such that calculation of annual carbon emissions and information collection are further facilitated.

Further, each filling station may be induced to reduce carbon emissions.

The effects that may be obtained from the present invention are not limited to the effects described above, and other effects that are not mentioned will be clearly understood by those skilled in the art to which the present invention pertains from the following description.

DETAILED DESCRIPTION OF ILLUSTRATIVE EMBODIMENTS

The embodiment disclosed in the present specification will be described in detail with reference to the accompanying drawings. However, the same or similar components will be given the same reference numerals irrespective of the drawing numbers, and the repetitive descriptions will be omitted. The suffixes "module" and "unit" for the components used in the following description are given or interchangeably used only in consideration of the ease of writing the specification and do not have meanings or roles distinct from each other by themselves. When it is determined that the specific description of the related and already known technology may obscure the gist of the embodiments disclosed in the specification, the specific description will be omitted. Further, it is to be understood that the accompanying drawings are for a better understanding of the embodiment disclosed in the present specification and that the technical ideas disclosed in the present specification are not limited by the accompanying drawings and include all the modifications, equivalents, or substitutes included in the spirit and technical scope of the present invention.

The terms including ordinal numbers such as first, second, and the like may be used to describe various components, but the components are not to be limited by the terms. The terms may only be used for the purpose of distinguishing one component from the other.

It is to be understood that when a component is referred to as being "connected" or "coupled" to another component, the component may be directly connected or coupled to the another component, but other components may exist in between. In contrast, when a component is referred to as being "directly connected" or "directly coupled" to another component, it is to be understood that there are no intervening components present.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, pails or combinations thereof in advance.

Figure 1:
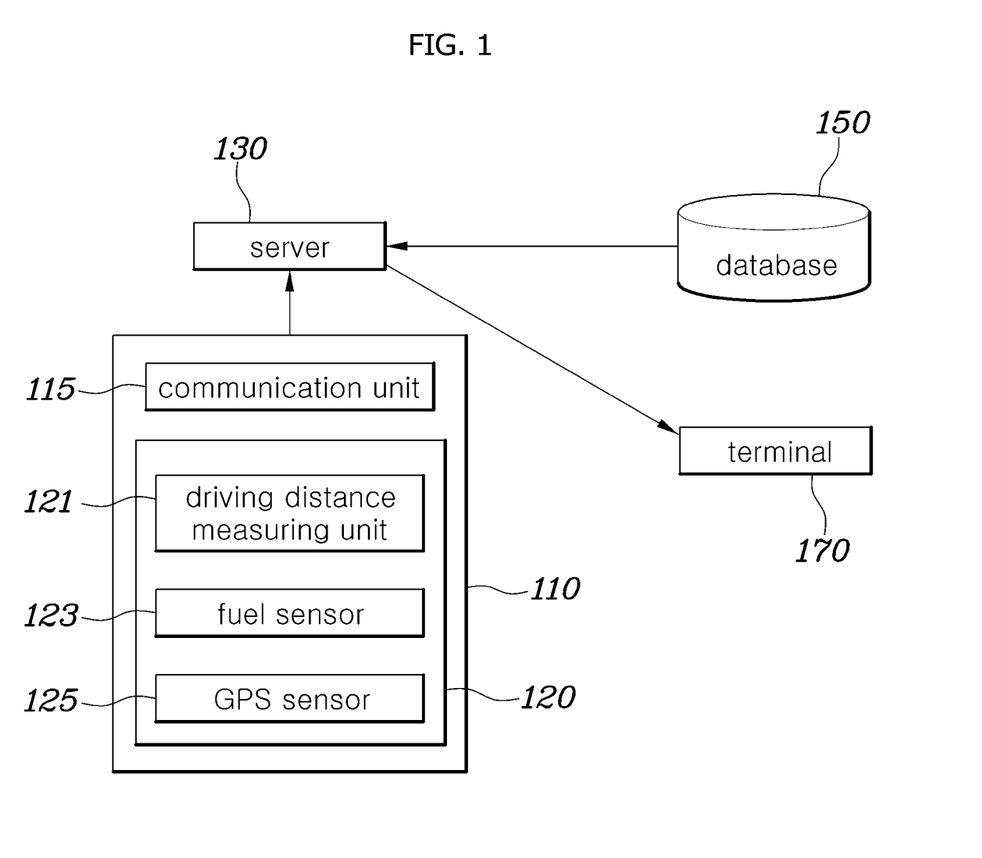
FIG. 1 illustrates a system for providing information on greenhouse gas emissions according to an embodiment of the present invention.

FIG. 1 illustrates a system for providing information on greenhouse gas emissions according to an embodiment of the present invention.

FIG. 1 shows that a system 100 for providing information on greenhouse gas emissions according to an embodiment of the present invention includes a vehicle 110, a server 130, a database 150, and a terminal 170.

The vehicle 110 obtains and transmits to the server 130 the driving information of the vehicle for providing information on greenhouse gas emissions according to the driving of the vehicle and includes a communication unit 115 and a sensor unit 120.

The communication unit 115 performs communication with the information providing server 130. For example, the communication unit 115 transmits the information obtained from the sensor unit 120 to the information providing server 130.

The communication unit 115 may include a near-field communication (NFC) chip, an NFC antenna, a Bluetooth module, a Wi-Fi module, a long-term evolution (LTE) communication module, a 5G communication module, and the like.

The sensor unit 120 obtains driving information of the vehicle for providing information on greenhouse gas emissions according to the driving of the vehicle. The sensor unit 120 includes a driving distance measuring unit 121, a fuel sensor 123, and a Global Positioning System (GPS) sensor 125.

The driving distance measuring unit 121 measures the driving distance of the vehicle. At this time, the driving distance measuring unit 121 may include an odometer of the vehicle.

The fuel sensor 123 measures the hydrogen level of the vehicle.

The GPS sensor 140 receives information on the current location of the vehicle from the GPS satellites.

The server 130 receives the driving distance, hydrogen level, and location information of the vehicle from the vehicle 110 to provide information on greenhouse gas emissions according to the driving of the vehicle, and obtains the location information of each hydrogen filling station, hydrogen production method of each filling station, and $CO_2$ emissions of each filling method from the database 150 to calculate the greenhouse gas emissions of the vehicle 110. Further, the server 130 transmits information on greenhouse gas emissions to the terminal 170.

The database 150 stores the location information of each hydrogen filling station, the hydrogen production method of each filling station, and the $CO_2$ emissions of each filling method.

At this time, the database 150 may be included in the server 130 and may be implemented as a separate database server or a separate device.

Figure 2:
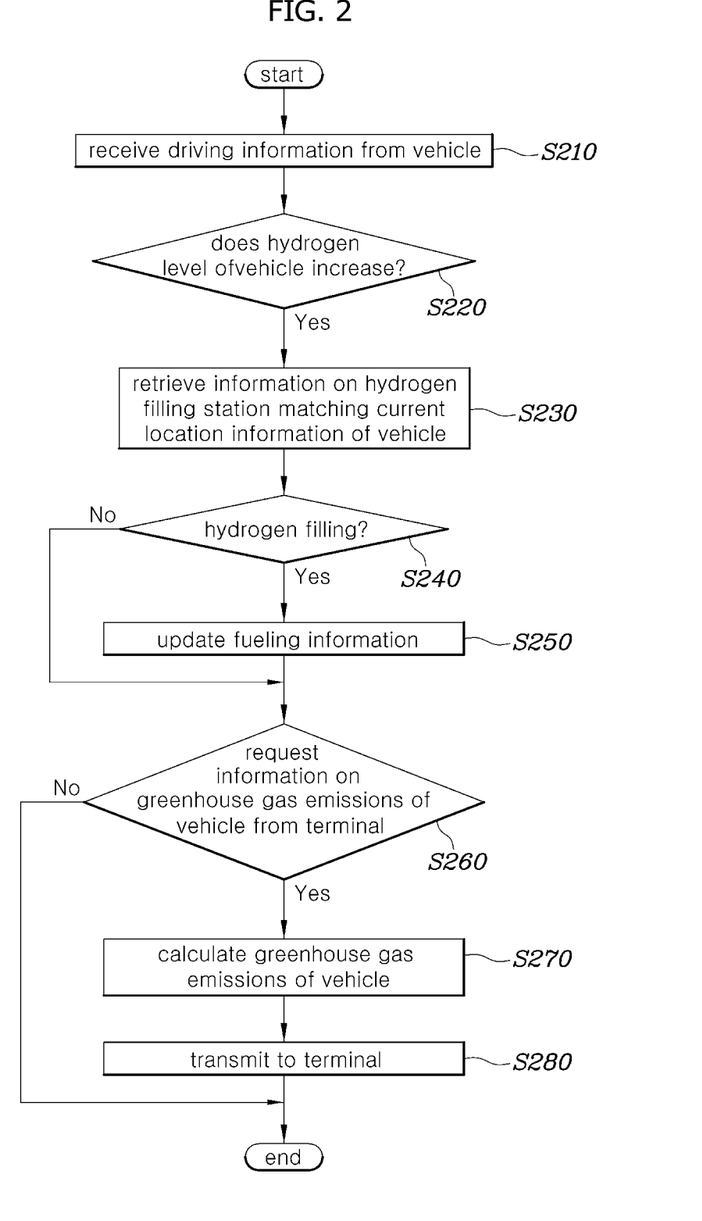
FIG. 2 illustrates a method of providing information on greenhouse gas emissions according to an embodiment of the present invention.

The terminal 170 provides the driver with the information on greenhouse gas emissions of the vehicle 110 calculated by the server 130. The terminal 170 may be applied to various terminals such as a smartphone, a portable terminal, a mobile terminal, a foldable terminal, a personal digital assistant (PDA), a portable multimedia player (PMP) terminal, a telematics terminal, a navigation terminal, a personal computer, a notebook computer, a slate PC, a tablet PC, an ultrabook, a wearable device (for example, a smartwatch, a smart glass, a head-mounted display (HMD), etc.), a wireless broadband (Wibro) terminal, an internet protocol television (IPTV) terminal, a smart TV, a digital broadcasting terminal, an audio video navigation (AVN) terminal, an audio/video (A/) system, a flexible terminal, a digital signage device, and the like FIG. 2 illustrates a method of providing information on greenhouse gas emissions according to an embodiment of the present invention. The method of providing information on greenhouse gas emissions according to the embodiment of FIG. 2 may be performed by the server 130 in FIG. 1.

FIG. 2 shows that the server 130 receives driving information from the vehicle 110 (S210).

At this time, the vehicle 110 may be a hydrogen vehicle, and the driving information may include the driving distance, hydrogen level, and location information of the vehicle 110.

At this time, the information on the driving distance, hydrogen level, and location may be the information collected from the vehicle 110 and updated in real time.

At this time, the driving distance of the vehicle may be the information measured by the driving distance measuring unit 121 of the vehicle 110.

At this time, the hydrogen level may be the information measured by the fuel sensor 123 of the vehicle 110.

At this time, the location information may be information obtained by the GPS sensor 125 of the vehicle 110.

Next, the server 130 checks whether the hydrogen level of the vehicle 110 increases (S220), retrieves information on the hydrogen filling station matching the current location information of the vehicle 110 from the database 150 (S230) when the hydrogen level of the vehicle 110 increases, and determines whether hydrogen is filled in the vehicle 110 based on whether there is a hydrogen filling station matching the current location information of the vehicle 110 in the database 150 (S240).

At this time, the information on the hydrogen filling station may include information on either of or both the hydrogen emission coefficient of the hydrogen filling station and greenhouse gas emissions discharged in the process of transporting the fuel to the filling station.

At this time, the information on the hydrogen filling station may include information for calculating the hydrogen emission coefficient instead of the hydrogen emission coefficient of the hydrogen filling station, and may further include information different from each other depending on the hydrogen production method of the hydrogen filling station.

For example, if hydrogen is produced by the water electrolysis method, the information on the hydrogen filling station may further include the amount of electricity used for hydrogen production and the emission coefficient of hydrogen-producing fuel of the hydrogen filling station.

In addition, when the hydrogen is produced by the carbon reforming method or the byproduct hydrogen method, the information on the hydrogen filling station may further include the calorific value of the hydrogen-producing fuel, the emission coefficient of hydrogen-producing fuel, and the amount of greenhouse gas captured in the production process of hydrogen.

At this time, the server 130 may determine whether hydrogen is filled in the vehicle no based on whether information on the hydrogen filling station matching the current location information of the vehicle 110 is present in the database 150.

At this time, it may be determined that hydrogen is filled in the vehicle 110 when the information on the hydrogen filling station matching the current location information of the vehicle 110 is present in the database 150.

At this time, it may not be determined that hydrogen is filled in the vehicle 110 when the information on the hydrogen filling station matching the current location information of the vehicle 110 is not present in the database 150.

When it is determined that hydrogen is filled in the vehicle 110 based on the determination result in the step S240, the server 130 updates the hydrogen filling information of the vehicle 110 (S250).

At this time, the hydrogen filling information may be updated in the memory of the server 130 or database 150.

In addition, the server 130 checks whether a request for information on greenhouse gas emissions of the vehicle 110 is received from the terminal 170 (S260) and calculates the greenhouse gas emissions of the vehicle 110 during any period when the information on greenhouse gas emissions of the vehicle 110 is requested by the terminal 170 (S270). Alternatively, the server 130 may calculate at certain intervals or in real time and store the greenhouse gas emissions regardless of the request from the terminal 170 and may transmit the stored information immediately upon the request of the terminal 170.

At this time, the greenhouse gas may include $CO_2$, $NO_4$, $CN_4$, and the like.

At this time, the greenhouse gas emissions may be calculated based on the cumulative hydrogen filling information and the cumulative driving information of the vehicle no for any period.

At this time, the server 130 may obtain the information on greenhouse gas emissions of the internal combustion engine vehicle equivalent (e.g., output, body size, etc.) to the corresponding vehicle 110 together with the greenhouse gas emissions from the database 150, subtract the greenhouse gas emissions of the vehicle 110 from the greenhouse gas emissions of an equivalent vehicle for the driving distance to be computed, and provide the information on the greenhouse gas reduction to the terminal 170.

At this time, the any period may be any period preset by the user, and the server 130 may receive the information thereon from the terminal 170.

At this time, the greenhouse gas emissions of the vehicle 110 may be calculated by Equation 1 below.

$$PE_{days}(tCO_{2-eq}) = \sum \left( EF_{BL,km} \left( \frac{tCO_{2-eq}}{km} \right) \times DD_{BL,days}(km) + PE_{Transport}(tCO_{2-eq}) \right) \quad \text{[Equation 1]}$$

In Equation 1, $PE_{days}$ denotes total greenhouse gas emissions for a set period, $EF_{BL,km}$ denotes the emission coefficient of each hydrogen production method, $DD_{BL,days}$ denotes the driving distance to each filling station at which hydrogen is filled in the vehicle, and $PE_{Transport}$ denotes the greenhouse gas emissions discharged in the process of transporting the fuel. On the other hand, $tCO_{2-eq}$ denotes a unit of emissions by which the greenhouse gas emissions are converted to $CO_2$ equivalent, and different criteria of emission conversion may be applied in each country. At this time, greenhouse gas may include $CO_2$, $NO_4$, $CN_4$, and the like, for example. Km denotes the unit of distance.

At this time, the reference date of $PE_{days}$ may be set by the user.

At this time, the user may request that the greenhouse gas emissions be calculated according to the criteria requested by the user, like annually, quarterly, monthly, weekly, and the like.

At this time, the user may request the information on greenhouse gas emissions of the vehicle 110 from the server 130 using the terminal 170, and the information about the relevant period may be transmitted to the server 130 when the request for the information on greenhouse gas emissions of the vehicle 110 is made.

At this time, $DD_{BL,days}$ denoting the driving distance to each hydrogen filling station is calculated on the assumption that even when additional hydrogen is filled, without using up all the hydrogen filled previously, at a filling station other than the previous station, the vehicle 110 uses the additional hydrogen only after the hydrogen filled previously is used up.

Figure 3:
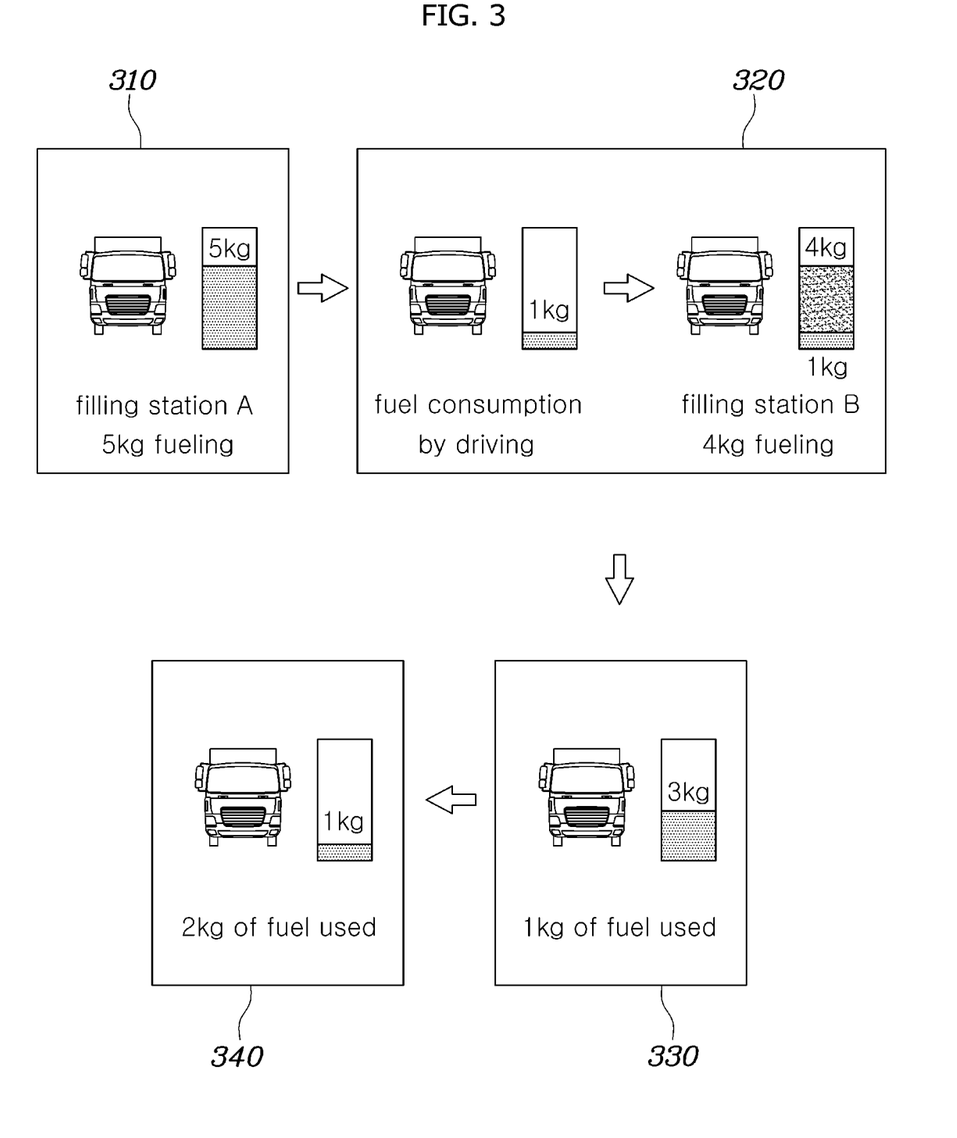
FIG. 3 illustrates an exemplary method of applying driving distance to each hydrogen filling station for calculating an emission coefficient according to an embodiment of the present invention.

For example, FIG. 3 shows that, when 5 kg of hydrogen is filled in the vehicle 110 at the first node 310, uses 4 kg of hydrogen before the filling station B 320 is reached, and then 4 kg of hydrogen is further filled at the second node 320, the unused 1 kg of hydrogen that was filled in the vehicle at the first node 310, i.e., the filling station A, is used first and the hydrogen that is filled in the vehicle at the second node 320, i.e., the filling station B, is then used during the subsequent driving. That is, the calculation assumes that the vehicle 110 first uses 1 kg of hydrogen that is filled at the filling station A 310 and is left unused at the second node 320 for driving to the third node 330 and then uses the hydrogen that is filled in the vehicle at the filling station B 320 for the driving from third node 330 to the fourth node 340 which consumes 2 kg of fuel.

Table 1 shows the distance $DD_{BL,days}$ to respective hydrogen filling stations, in which the distance from the first node 310 to the second node 320 is denoted by c, the distance from the second node 320 to the third node 330 is denoted by d, and the distance from the third node 330 to the fourth node 340 is denoted by e.

TABLE 1

| | First node 310 | Second node 320 | Third node 330 | Four node 340 |
|---|---|---|---|---|
| Filling station A | 0 | c | c + d | c + d |
| Filling station B | 0 | 0 | 0 | E |

On the other hand, the hydrogen production method at each hydrogen filling station typically includes the water electrolysis method, reformed hydrogen method, and byproduct hydrogen method, and the calculation method of $EF_{BK,km}$, which is the emission coefficient of each hydrogen production method, varies according to production methods. The calculation methods of emission coefficient $EF_{BK,km}$ are described for the respective hydrogen production method in the following. The water electrolysis method is a method of decomposing water to produce hydrogen by applying electric energy to water. According to the water electrolysis method, hydrogen may be obtained by the chemical formula expressed in Equation 2 below.

$$C_XH_{2X+1} + 2XH_2O = (3X+1)H_2 + XCO_2) \quad \text{[Equation 2]}$$

Different values may be applied to X according to the water electrolysis method in Equation 2.

On the other hand, since the water electrolysis method uses electricity for hydrogen production, the emission coefficient of the water electrolysis method is calculated based on the greenhouse gas emissions discharged by the electricity production. Specifically, the emission coefficient of water electrolysis method is calculated by multiplying the fuel efficiency of the hydrogen vehicle during the driving period, the ratio of the amount of electricity used for hydrogen production, and the electricity emission coefficient. That is, the coefficient may be calculated by Equation 3 below.

$$EF_{BL,km}(tCO_{2-eq}/km) = SFC_{BL}(tH_2/km) \times HME_{BL}(kw/tH_2) \times XEF_{H2,days}(tCO_{2-eq}/kw) \quad \text{[Equation 3]}$$

In Equation 3, $EF_{BL,km}$ denotes the emission coefficient of each hydrogen production method, $SFC_{BK}$ denotes the fuel efficiency of the hydrogen vehicle during the driving period, $HME_{BL}$ denotes the amount of electricity used for hydrogen production, and $EF_{H2,days}$ denotes the emission coefficient of hydrogen-producing fuel of each filling station. $tCO_{2-eq}$ denotes the unit of greenhouse gas emissions by which the greenhouse gas emissions are converted to $CO_2$ equivalent, and different criteria may be applied to the emission conversion in each country. At this time, the greenhouse gas may include $CO_2$, $NO_4$, $CN_4$, and the like, for example. tH2 denotes the unit of hydrogen emissions, km denotes the unit of distance, and kw denote the unit of electricity.

Equation 3 confirms that the emission coefficient of each hydrogen production method considers the amount of greenhouse gas discharged in the production process of hydrogen employed by each hydrogen filling station and the fuel-efficient driving of the driver.

On the other hand, the reformed hydrogen method uses gas to produce hydrogen. The emission coefficient may be calculated based on the greenhouse gas emissions generated during hydrogen production according to the reformed raw materials, and if carbon is captured, may be reduced based on the captured amount. Specifically, the coefficient is calculated by multiplying the fuel efficiency of the hydrogen vehicle with the value obtained by subtracting the ratio of captured greenhouse gas to the produced hydrogen from the value obtained by multiplying the net calorific value of the fuel used for hydrogen production with the emission coefficient of the hydrogen-producing fuel. That is, the emission coefficient of the reformed hydrogen method may be calculated by Equation 4 below.

$$EF_{BL,km} = SFC_{BL}\left(\frac{tH_2}{km}\right) \times$$
$$\left(NCV_{BL}\left(\frac{j}{tH_2}\right) \times EF_{H2,days}\left(\frac{tCO_{2-eq}}{j}\right) - dec_{H2}(tCO_{2-eq}/tH_2)\right)$$
[Equation 4]

In Equation 4, $EF_{BL,km}$ denotes the emission coefficient of each hydrogen production method, $SFC_{BK}$ denotes the fuel efficiency of the hydrogen vehicle during the driving period, and $NCV_{BL}$ denotes the net calorific value of the hydrogen-producing fuel. $EF_{H2,days}$ denotes the emission coefficient of hydrogen-producing fuel of each filling station, and decH2 denotes the greenhouse gas captured in the production process of hydrogen. $tCO_{2-eq}$ denotes the unit of greenhouse gas emissions by which the greenhouse gas emissions are converted to $CO_2$ equivalent, and different criteria may apply to the emission conversion in each country. At this time, the greenhouse gas may include $CO_2$, $NO_4$, $CN_4$, and the like, for example. $tH_2$ denotes the unit of hydrogen emissions, km denotes the unit of distance, and j denotes the unit of calories.

At this time, the net calorific value $NCV_{BL}$ of hydrogen-producing fuel may be the calorific value minus the latent heat of water vapor generated in the combustion process of fuel.

On the other hand, the byproduct hydrogen method is a method of capturing hydrogen incidentally generated in a petrochemical process, a steel-making process, or the like, and hydrogen is produced in the naphtha cracking process. In the byproduct hydrogen method, the emission coefficient is calculated based on the greenhouse gas incidentally generated for hydrogen capturing in the production process and subtraction is made therefrom based on the captured amount of carbon when carbon is captured. Specifically, the carbon emission coefficient of the byproduct hydrogen method is calculated by multiplying the fuel efficiency of the hydrogen vehicle with the value obtained by subtracting the ratio of the captured greenhouse gas to the produced hydrogen from the value obtained by multiplying the net calorific value of the fuel used for hydrogen capturing with the emission coefficient of hydrogen-producing fuel. That is, the emission coefficient of the byproduct hydrogen method may be calculated by Equation 5 below.

$$EF_{BL,km} = SFC_{BL}\left(\frac{tH_2}{km}\right) \times$$
$$\left(NCV_{BL}\left(\frac{j}{tH_2}\right) \times EF_{H2,days}\left(\frac{tCO_{2-eq}}{j}\right) - dec_{H2}(tCO_{2-eq}/tH_2)\right)$$
[Equation 5]

In Equation 5, $EF_{BL,km}$ denotes the emission coefficient of each hydrogen production method, SFCBK denotes the fuel efficiency of the hydrogen vehicle during the driving period, $NCV_{BL}$ denotes the net calorific value of the hydrogen-producing fuel. $EFH2_{,days}$ denotes the emission coefficient of hydrogen-producing fuel of each filling station, and decH2 denotes the greenhouse gas captured in the production process of hydrogen. $tCO_{2-eq}$ denotes the unit of greenhouse gas emissions by which the greenhouse gas emissions are converted to $CO_2$ equivalent, and different criteria may be applied to the emission conversion in each country. At this time, the greenhouse gas may include $CO_2$, $NO_4$, $CN_4$, and the like, for example. $tH_2$ denotes the unit of hydrogen emissions, and j denotes the unit of calories.

Accordingly, the greenhouse gas emissions of the vehicle may be calculated by applying the emission coefficients of the respective hydrogen production methods in Equations 3 to 5 to Equation 1.

FIG. 2 shows that the server 130 transmits the greenhouse gas emissions of the vehicle 110 calculated in the step S270 to the terminal 170 (S280).

Figure 4:
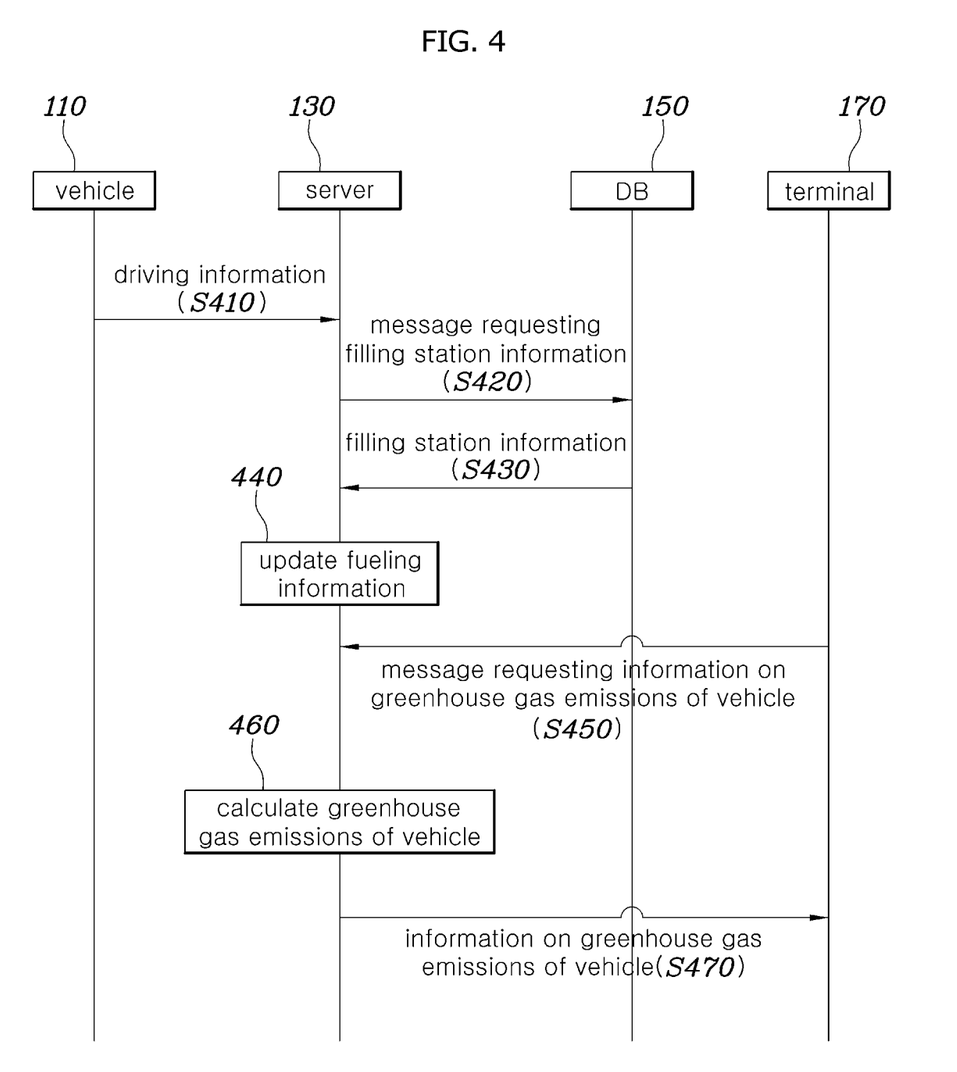
FIG. 4 is a flowchart illustrating data transmission and reception of a system for providing information on greenhouse gas emissions according to an embodiment of the present invention.

FIG. 4 is a flowchart illustrating data transmission and reception of a system for providing information on greenhouse gas emissions according to an embodiment of the present invention.

FIG. 4 shows that the vehicle 110 transmits the driving information to the server 130 (S410).

At this time, the driving information may include the driving distance, hydrogen level, and location information of the vehicle 110.

At this time, the driving distance, hydrogen level, and GPS information may be measured from the vehicle 110 and updated in real time.

At this time, the driving distance of the vehicle may be measured by the driving distance measuring unit 121 of the vehicle 110.

At this time, the hydrogen level may be measured by a fuel sensor 123 of the vehicle 110.

At this time, the location information may be the information obtained by a GPS sensor 125 of the vehicle 110.

Further, the server 130 transmits a message requesting information on the filling stations at which hydrogen is filled in the vehicle 110 to the database 150 and receives information on the filling stations at which hydrogen is filled in the vehicle 110 from the database 150 in response thereto.

At this time, the message requesting the filling station information may include GPS information on the location at which the hydrogen level of the vehicle 110 increases.

At this time, the filling station information may include the information on the filling station matching the location at which the hydrogen level of the vehicle 110 increases.

At this time, the filling station information may include at least one or more of hydrogen production method of the filling station, the emission coefficient of each production method, and the greenhouse gas emissions discharged in the process of transporting the fuel.

Further, the server 130 receives a request for information on the greenhouse gas emissions of the vehicle 110 from the terminal 170 (S450) and calculates the greenhouse gas emissions of the vehicle 110 during any period (S460) to transmit the information on the calculated greenhouse gas emissions to the terminal 170 in response thereto (S470).

At this time, the greenhouse gas may be $CO_2$.

At this time, the greenhouse gas emissions may be calculated based on the cumulative hydrogen filling information and cumulative driving information of the vehicle 110 during any period.

At this time, the any period may be a period preset by the user, and the server 130 may receive the information thereon from the terminal 170.

At this time, the greenhouse gas emissions of the vehicle 110 may be calculated by Equations 1 to 5 and related descriptions.

On the other hand, the step S450 may be omitted, and the server 130 may calculate in real time or at preset intervals and transmit to the terminal 170 the greenhouse gas emissions of the vehicle 110 regardless of receiving the request message of the terminal 170.

Figure 5:
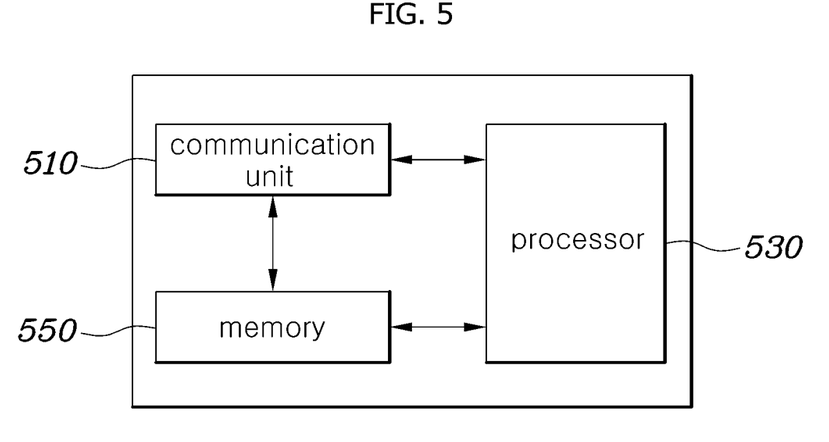
FIG. 5 illustrates a computer system according to an embodiment of the present invention.

FIG. 5 illustrates a computer system according to an embodiment of the present invention.

FIG. 5 shows that the embodiment of the present invention may be implemented in a computer system such as a non-transitory computer-readable recording medium. As illustrated in FIG. 5, a computer system 500 includes a communication unit 510, a processor 530, and a memory 550.

The communication unit 510 is connected to the processor 530 to directly obtain information or to transmit and/or receive information of the vehicle, the database/database server, and the terminal.

For example, the communication unit 510 receives the driving information from the vehicle, transmits to the database a message requesting information on the filling stations at which hydrogen is filled in the vehicle, receives the filling station information from the database, receives a message requesting information on the greenhouse gas emissions of the vehicle from the terminal, and transmits information on the greenhouse gas emissions of the vehicle to the terminal.

At this time, the message requesting the filling station information may include information on the location at which the hydrogen level of the vehicle increases.

At this time, the driving information may include at least one or more of the driving distance, hydrogen level, and location information of the vehicle.

At this time, the filling station information may include either of or both the hydrogen emission coefficients of the respective filling stations at which hydrogen is filled in the vehicle and the greenhouse gas emissions discharged in the process of transporting the fuel.

At this time, the filling station information may further include information different from each other according to the hydrogen production methods of the filling stations.

At this time, the filling station information may further include the amount of electricity used for hydrogen production and the emission coefficient of hydrogen-producing fuel at the filling station when the filling station produces hydrogen by the water electrolysis method.

At this time, the filling station information may further include the net calorific value of hydrogen-producing fuel, the emission coefficient of hydrogen-producing fuel, and the amount of greenhouse gas captured in the production process of hydrogen when the filling station produces hydrogen by the reformed hydrogen method or the byproduct hydrogen method.

The processor 530 implements a method of providing information on the greenhouse gas emissions of the vehicle as proposed herein. Specifically, the processor 530 implements all the operations of the server described in the embodiment disclosed herein and performs all the operations of the method of providing information on the greenhouse gas emissions of the vehicle according to FIG. 2.

For example, the processor 530 updates hydrogen filling information of the vehicle in the memory 550 or database and calculates the greenhouse gas emissions of the vehicle.

At this time, the greenhouse gas emissions may be calculated by multiplying the hydrogen emission coefficient of the hydrogen filling station, the driving distance to each filling station at which hydrogen is filled in the vehicle, and the greenhouse gas emissions discharged in the process of transporting the fuel.

At this time, the driving distance to each filling station at which hydrogen is filled in the vehicle may be calculated on the assumption that even when additional hydrogen is filled, without using up all the hydrogen filled previously, at a filling station other than the previous station, the additional hydrogen is used only after the hydrogen filled previously is used up.

At this time, the hydrogen emission coefficient may be calculated by multiplying the fuel efficiency of the hydrogen vehicle, the ratio of the amount of electricity used for hydrogen production, and the electricity emission coefficient when the filling station produces hydrogen by the water electrolysis method.

At this time, the hydrogen emission coefficient may be calculated by multiplying the fuel efficiency of the hydrogen vehicle with the value obtained by subtracting the ratio of the captured greenhouse gas to the produced hydrogen from the value obtained by multiplying the net calorific value of the fuel used for hydrogen production with the emission coefficient of hydrogen-producing fuel when the filling station produces hydrogen by the reformed hydrogen method or byproduct hydrogen method.

The memory 550 may be a volatile or nonvolatile storage medium in various forms. At this time, the memory 550 may store at least or more of the driving information, the message requesting the filling station information, the filling station information, the message requesting information on greenhouse gas emission, the information on greenhouse gas emission, information on hydrogen filling of the vehicle, and greenhouse gas emissions of the vehicle.

According to the embodiments of the present invention described thus far, the drivers may be induced to drive conscious of the carbon emissions by providing the drivers with the carbon emissions in real time.

Further, from the viewpoint of corporations, the carbon emissions in the processing of driving the hydrogen vehicle may be monitored in real time such that the annual carbon emissions may be calculated and the information on carbon emissions may be readily collected.

Further, from the viewpoint of the government, each hydrogen filling station may be induced to reduce carbon emissions.

On the other hand, the embodiments of present invention described above may be implemented as a computer-readable code in a medium in which a program is recorded. The computer-readable medium includes all kinds of recording devices in which data readable by a computer system is stored. An example of the medium readable by a computer includes a hard disk drive (HDD), silicon disk drive (SDD), ROM, RAM, CD-ROM, magnetic tape, floppy disk, optical data storage device, and the like. Accordingly, the description detailed above is not to be construed as restrictive in all respects but is to be considered illustrative. The scope of the present invention is to be determined by a reasonable interpretation of the appended claims, and all modifications within the equivalent scope of the present invention are included in the scope of the present invention.

What is claimed is:

1. A method of providing information on greenhouse gas emissions of a vehicle, the method comprising:
   receiving, by a server, driving information from the vehicle;
   determining, by the server, a filling station at which hydrogen is filled when it is determined based on the driving information that the hydrogen was filled in the vehicle; and
   determining, by the server, the greenhouse gas emissions of the vehicle based on a hydrogen production method of the determined filling station and the driving information.

2. The method of claim 1, wherein the driving information includes at least one or more of a driving distance, a hydrogen level, and location information of the vehicle.

3. The method of claim 1, wherein the greenhouse gas emissions discharged in the process of transporting hydrogen-producing fuel are further used to determine the greenhouse gas emissions of the vehicle.

4. The method of claim 1, wherein an amount of electricity used for hydrogen production and an emission coefficient of hydrogen-producing fuel at the hydrogen filling station are further used to determine the greenhouse gas emissions of the vehicle when the filling station produces hydrogen by a water electrolysis method.

5. The method of claim 1, wherein a net calorific value of hydrogen-producing fuel, an emission coefficient of the hydrogen-producing fuel, and an amount of greenhouse gas captured in a production process of hydrogen are further used to determine the greenhouse gas emissions of the vehicle when the filling station produces hydrogen by a reformed hydrogen method or a byproduct hydrogen method.

6. The method of claim 1, wherein the greenhouse gas emissions are determined by multiplying a hydrogen emission coefficient of the hydrogen filling station, a driving distance to each filling station at which hydrogen is filled in the vehicle, and greenhouse gas emissions discharged in a process of transporting fuel.

7. The method of claim 6, wherein the driving distance to each filling station at which hydrogen is filled in the vehicle is determined on an assumption that even when additional hydrogen is filled, without using up all the hydrogen filled previously, at a filling station other than the previous station, the additional hydrogen is used only after the hydrogen filled previously is used up.

8. The method of claim 6, wherein the hydrogen emission coefficient is determined by multiplying fuel efficiency of the hydrogen vehicle during a driving period, a ratio of an amount of electricity used for hydrogen production, and an electricity emission coefficient when the filling station produces hydrogen by a water electrolysis method.

9. The method of claim 6, wherein the hydrogen emission coefficient is determined by multiplying fuel efficiency of the hydrogen vehicle with a value obtained by subtracting a ratio of captured greenhouse gas to produced hydrogen from a value obtained by multiplying a net calorific value of the fuel used for hydrogen production with an emission coefficient of hydrogen-producing fuel when the filling station produces hydrogen by a reformed hydrogen method or a byproduct hydrogen method.

10. The method of claim 1, further comprising:
transmitting, by the server, to a database a message requesting information on the filling station at which hydrogen is filled in the vehicle;
receiving, by the server, the filling station information from the database;
updating information on hydrogen filling of the vehicle in a memory or the database;
receiving, by the server, a message requesting information on greenhouse gas emissions of the vehicle from a terminal; and
transmitting, by the server, information on greenhouse gas emissions of the vehicle to the terminal.

11. The method of claim 10, wherein the message requesting the filling station information includes information on a location at which a hydrogen level of the vehicle increases.

12. A server providing information on greenhouse gas emissions of a vehicle, the server comprising:
a processor;
a non-transitory storage medium coupled to the processor;
a communication unit configured to receive driving information from the vehicle, the storage medium storing instructions that, when executed by the processor, cause the processor to:
determine a filling station at which hydrogen filling is performed when it is determined based on the driving information that the vehicle performed hydrogen filling;
determine the greenhouse gas emissions of the vehicle based on a hydrogen production method of the filling station and the driving information; and
store at least one or more of the information on the filling station at which the hydrogen filling is performed, the hydrogen production method of the filling station, and the greenhouse gas emissions of the vehicle.

13. The server of claim 12, wherein the driving information includes at least one or more of a driving distance, a hydrogen level, and location information of the vehicle.

14. The server of claim 12, wherein the greenhouse gas emissions discharged in the process of transporting the fuel are further used to determine the greenhouse gas emissions of the vehicle.

15. The server of claim 12, wherein an amount of electricity used for hydrogen production and an emission coefficient of hydrogen-producing fuel at the hydrogen filling station are further used to determine the greenhouse gas emissions of the vehicle when the filling station produces hydrogen by a water electrolysis method.

16. The server of claim 12, wherein an amount of electricity used for hydrogen production, an emission coefficient of hydrogen-producing fuel, and an amount of greenhouse gas captured in a production process of hydrogen are further used to determine the greenhouse gas emissions of the vehicle when the filling station produces hydrogen by a reformed hydrogen method or a byproduct hydrogen method.

17. The server of claim 12, wherein the greenhouse gas emissions are determined by multiplying a hydrogen emission coefficient of the hydrogen filling station, a driving distance to each filling station at which hydrogen is filled in the vehicle, and greenhouse gas emissions discharged in a process of transporting fuel.

18. The server of claim 17, wherein the distance to each filling station at which hydrogen is filled in the vehicle is determined on an assumption that even when additional hydrogen is filled, without using up all the hydrogen filled previously, at a filling station other than the previous station, the additional hydrogen is used only after the hydrogen filled previously is used up.

19. The server of claim 17, wherein the hydrogen emission coefficient is determined by multiplying fuel efficiency of the hydrogen vehicle during a driving period, a ratio of an amount of electricity used for hydrogen production, and an electricity emission coefficient when the filling station produces hydrogen by a water electrolysis method.

20. The server of claim 17, wherein the hydrogen emission coefficient is determined by multiplying fuel efficiency of the hydrogen vehicle with a value obtained by subtracting a ratio of captured greenhouse gas to produced hydrogen from a value obtained by multiplying a net calorific value of the fuel used for hydrogen production with an emission coefficient of hydrogen-producing fuel when the filling station produces hydrogen by a reformed hydrogen method or a byproduct hydrogen method.

21. The server of claim 12, wherein the communication unit transmits to a database a message requesting information on the filling station at which hydrogen is filled in the vehicle, receives the filling station information from the database, receives a message requesting information on greenhouse gas emissions of the vehicle, and transmits information on greenhouse gas emissions of the vehicle to a terminal, and the processor updates information on the hydrogen filling of the vehicle in a memory or the database.

22. The server of claim 21, wherein the message requesting the filling station information includes information on a location at which a hydrogen level of the vehicle increases.

\* \* \* \* \*